(12) United States Patent
Stribrny et al.

(10) Patent No.: US 11,414,197 B2
(45) Date of Patent: Aug. 16, 2022

(54) AIRFOIL ARM RESTRAINT SYSTEMS

(71) Applicant: AMI INDUSTRIES, INC., Colorado Springs, CO (US)

(72) Inventors: Casey Andrew Stribrny, Colorado Springs, CO (US); Nicholas Kersi Charles Bharucha, Colorado Springs, CO (US); Steve Andrew Holstine, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 22 days.

(21) Appl. No.: 17/162,841

(22) Filed: Jan. 29, 2021

(65) Prior Publication Data

US 2021/0316870 A1 Oct. 14, 2021

Related U.S. Application Data

(60) Provisional application No. 63/007,518, filed on Apr. 9, 2020.

(51) Int. Cl.
*B64D 25/04* (2006.01)
*B64D 25/10* (2006.01)

(52) U.S. Cl.
CPC ............ *B64D 25/04* (2013.01); *B64D 25/10* (2013.01)

(58) Field of Classification Search
CPC ...... B64D 25/04; B64D 25/10; B64D 11/062; B64D 11/0689; B64D 11/0616; B64D 11/0644; B64D 25/06
See application file for complete search history.

(56) References Cited

U.S. PATENT DOCUMENTS

| | | | |
|---|---|---|---|
| 2,829,850 A | 4/1958 | Culver | |
| 3,679,157 A * | 7/1972 | Roberts | B64D 25/10 244/122 A |
| 3,833,191 A * | 9/1974 | Morton | B64D 25/10 244/122 A |
| 4,247,064 A | 1/1981 | Schulman et al. | |
| 4,261,535 A * | 4/1981 | Swanson | B64D 25/10 296/180.1 |
| 4,480,806 A | 11/1984 | Duncan | |
| 4,508,294 A * | 4/1985 | Lorch | B64D 25/02 244/122 AG |
| 4,813,634 A * | 3/1989 | Zuck | B64D 25/08 244/89 |
| 4,901,951 A | 2/1990 | Tran et al. | |
| 5,415,366 A * | 5/1995 | Mastrolia | B64D 25/02 244/122 AG |

(Continued)

FOREIGN PATENT DOCUMENTS

| | | |
|---|---|---|
| GB | 2253597 | 9/1992 |
| GB | 2475371 | 5/2011 |

OTHER PUBLICATIONS

United Kingdom Intellectual Property Office, United Kingdom Search Report dated Sep. 1, 2021 in Application No. 2105014.1.

*Primary Examiner* — Justin M Benedik
(74) *Attorney, Agent, or Firm* — Snell & Wilmer L.L.P.

(57) ABSTRACT

An arm restraint assembly for an ejection seat may comprise a primary arm configured to pivot about a primary arm pivot joint, and a secondary arm configured to pivot about a secondary arm pivot joint. A primary airfoil structure may be coupled to the primary arm assembly. The primary airfoil structure may include an airfoil body.

20 Claims, 11 Drawing Sheets

(56) References Cited

U.S. PATENT DOCUMENTS

| | | | |
|---|---|---|---|
| 6,315,245 B1* | 11/2001 | Ruff | B64D 25/02 |
| | | | 244/122 AG |
| 6,685,135 B2* | 2/2004 | Geissler | B64D 10/00 |
| | | | 244/4 A |
| 7,097,134 B1* | 8/2006 | Blum | A63C 5/11 |
| | | | 244/4 A |
| 8,485,471 B2 | 7/2013 | Patterson et al. | |
| 2011/0114790 A1* | 5/2011 | Patterson | B64D 25/10 |
| | | | 244/122 AG |
| 2017/0349292 A1 | 12/2017 | Adams et al. | |
| 2021/0155348 A1* | 5/2021 | Holstine | B64D 11/062 |

* cited by examiner

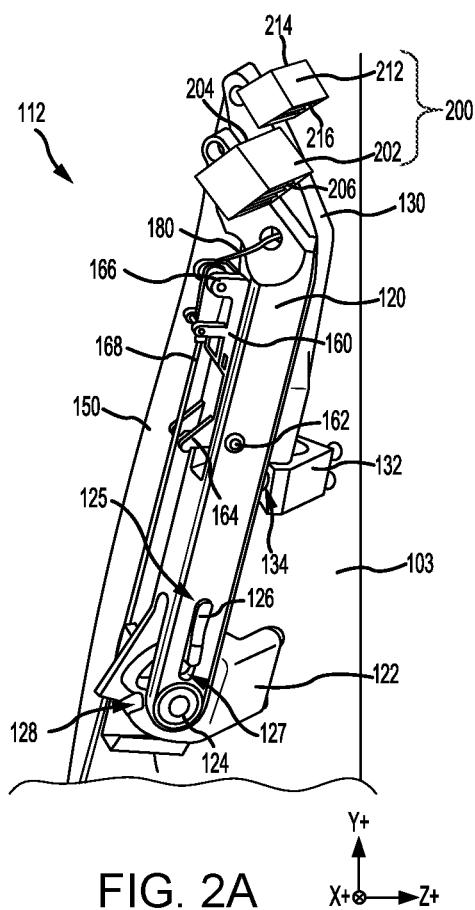
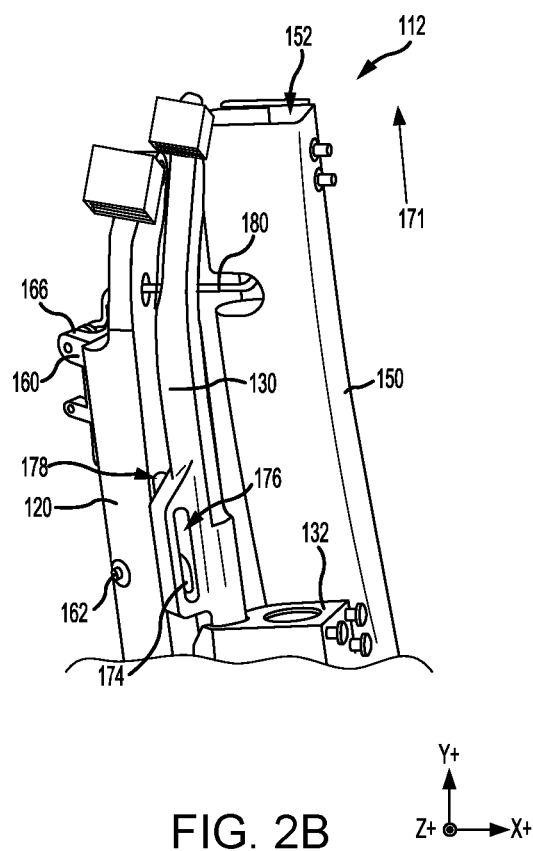
FIG. 2A
FIG. 2B

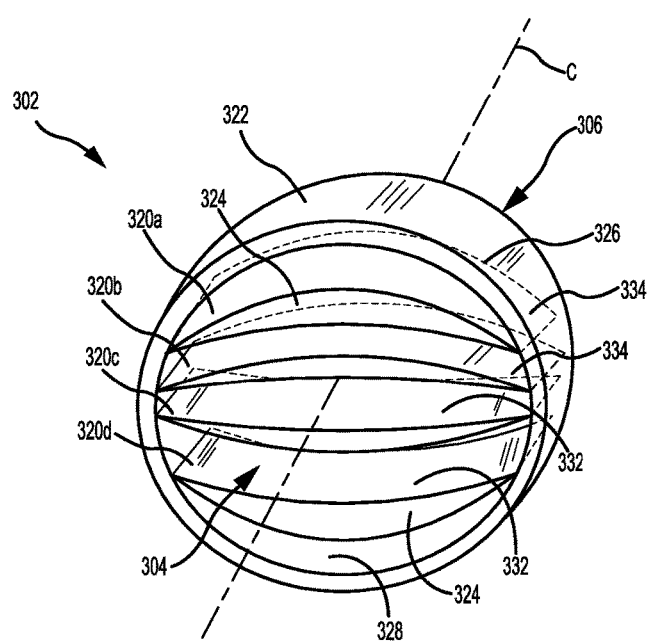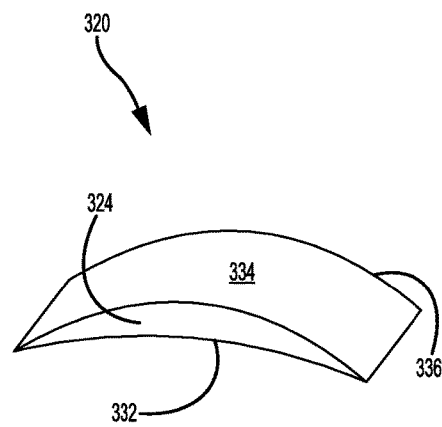
FIG. 6A
FIG. 6B

AIRFOIL ARM RESTRAINT SYSTEMS

CROSS-REFERENCE TO RELATED APPLICATIONS

This application claims priority to, and the benefit of, U.S. Provisional Application Ser. No. 63/007,518, filed Apr. 9, 2020 and titled "AIRFOIL ARM RESTRAINT SYSTEMS," which is incorporated by reference herein in its entirety for all purposes.

FIELD

The present disclosure relates to ejection seats, and more specifically, to ejection seat arm restraint systems having airfoils.

BACKGROUND

Ejection systems are designed to expel pilots from an aircraft cockpit. Upon ejection from the cockpit, the pilot enters the wind stream (also referred to as a "windblast") at the surface of the aircraft canopy. The pressure imposed on the pilot and ejection seat, upon entering the windblast, can alter the pitch, the roll, and the yaw or otherwise destabilize the ejection seat, thereby increasing the risk of injury to the seat occupant.

SUMMARY

An arm restraint assembly for an ejection seat is disclosed herein. In accordance with various embodiments, the arm restraint assembly may comprise a primary arm configured to pivot about a primary arm pivot joint, a secondary arm configured to pivot about a secondary arm pivot joint, and a primary airfoil structure coupled to the primary arm. The primary airfoil structure may include a first airfoil body.

In various embodiments, the primary airfoil structure may be coupled to an end of the primary arm opposite the primary arm pivot joint. In various embodiments, the primary airfoil structure may further include a housing defining an inlet and an outlet of the primary airfoil structure, and a plurality of airfoil bodies located within the housing. The plurality of airfoil bodies may include the first airfoil body and a second airfoil body.

In various embodiments, at least one of a first camber of the first airfoil body may be different from a second camber of the second airfoil body or a first attack angle of the first airfoil body may be different from a second attack angle of the second airfoil body. In various embodiments, a first pressure side of the first airfoil body may be oriented toward a second pressure side of the second airfoil body.

In various embodiments, a leading edge of the first airfoil body may be oriented forward, when the primary arm is in a fully deployed position. In various embodiments, a lock assembly may be operably coupled to the primary arm. In the fully deployed position, the lock assembly may limit a rotation of the primary arm about the primary arm pivot joint.

In various embodiments, a secondary airfoil structure may be coupled to the secondary arm. The secondary airfoil structure may include a second airfoil body. In various embodiments, at least one of a first camber of the first airfoil body may be different from a second camber of the second airfoil body or a first attack angle of the first airfoil body may be different from a second attack angle of the second airfoil body.

An ejection seat is also disclosed herein. In accordance with various embodiments, the ejection seat may comprise a seat back and an arm restraint assembly coupled to the seat back. The arm restraint assembly may comprise a primary arm configured to pivot relative to the seat back, and a primary airfoil structure coupled to the primary arm. The primary airfoil structure may include a first airfoil body.

In various embodiments, the primary airfoil structure may further include a housing defining an inlet and an outlet of the primary airfoil structure, and a plurality of airfoil bodies located within the housing. The plurality of airfoil bodies may include the first airfoil body and a second airfoil body.

In various embodiments, at least one of a first camber of the first airfoil body may be different from a second camber of the second airfoil body or a first attack angle of the first airfoil body may be different from a second attack angle of the second airfoil body.

In various embodiments, a first pressure side of the first airfoil body may be oriented toward a second pressure side of the second airfoil body.

In various embodiments, a secondary arm may be configured to pivot relative to the seat back. A secondary airfoil structure may be coupled to the secondary arm. The secondary airfoil structure may include a second airfoil body. In various embodiments, at least one of a first camber of the first airfoil body may be different from a second camber of the second airfoil body or a first attack angle of the first airfoil body may be different from a second attack angle of the second airfoil body.

An arm restraint assembly for an ejection seat, in accordance with various embodiments, may comprise a primary arm configured to pivot about a primary arm pivot joint, and a secondary arm configured to pivot about a secondary arm pivot joint. At least one of the primary arm or the secondary arm may be an airfoil.

In various embodiments, in a fully deployed position, a leading edge of the airfoil may be oriented forward. In various embodiments, a netting may be coupled to the airfoil.

In various embodiments, a latch may be coupled to the primary arm. The latch may include a hook portion. The secondary arm may define a secondary latch orifice configured to receive the hook portion.

In various embodiments, a lock assembly may be operably coupled to the primary arm. In the fully deployed position, the lock assembly may limit a rotation of the primary arm.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 2A and 2B illustrate an arm restraint assembly in a non-deployed position and including an airfoil system, in accordance with various embodiments;

FIGS. 6A and 6B illustrates an airfoil assembly and an airfoil structure, respectively, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
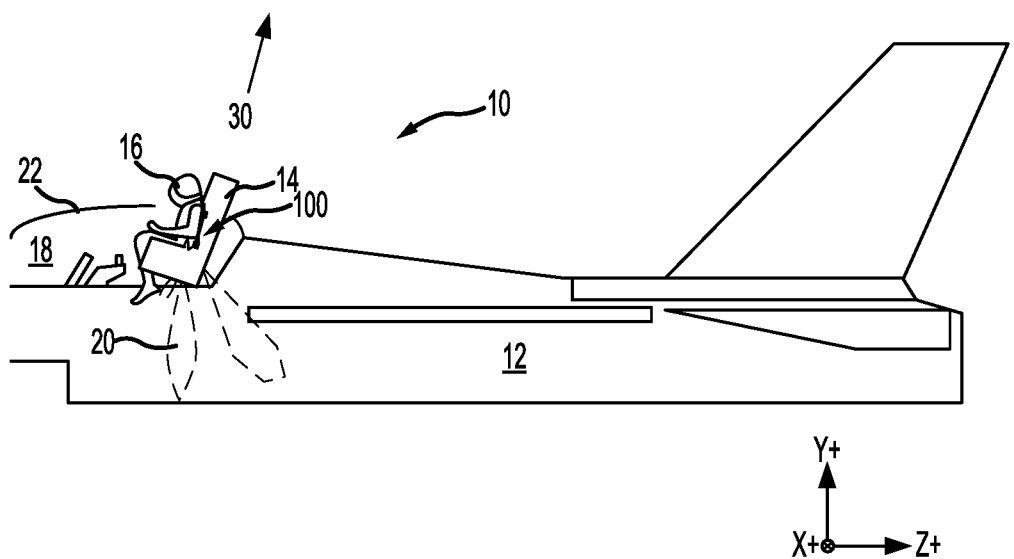
FIG. 1A illustrates an ejection seat being launched from an aircraft cockpit, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20.

In accordance with various embodiments, ejection seat 14 includes an arm restraint assembly 100. Arm restraint assembly 100 may be configured to deploy while the arms of occupant 16 are located within cockpit 18. Stated differently, ejection system 10 may cause arm restraint assembly 100 to deploy prior to the arms of occupant 16 entering the wind stream outside of cockpit 18 (i.e., outside a canopy 22 of aircraft 12). Arm restraint assembly 100 is configured to limit rearward movement of the arms of occupant 16. Stated differently, in a deployed position, arm restraint assembly 100 may limit the arms of occupant 16 from moving aftward, toward the tail end of aircraft 12 (i.e., in the positive Z-direction on the provided XYZ axes).

As described herein, arm restraint assembly 100 may include one or more airfoil structured mounted to or formed by the primary arm and/or the secondary arm of the arm restraint system. The airfoil structures may, upon deployment, stabilize the ejection seat and/or reduce changes in the pitch and/or the yaw and/or the roll of the ejection seat.

Figure 1B:
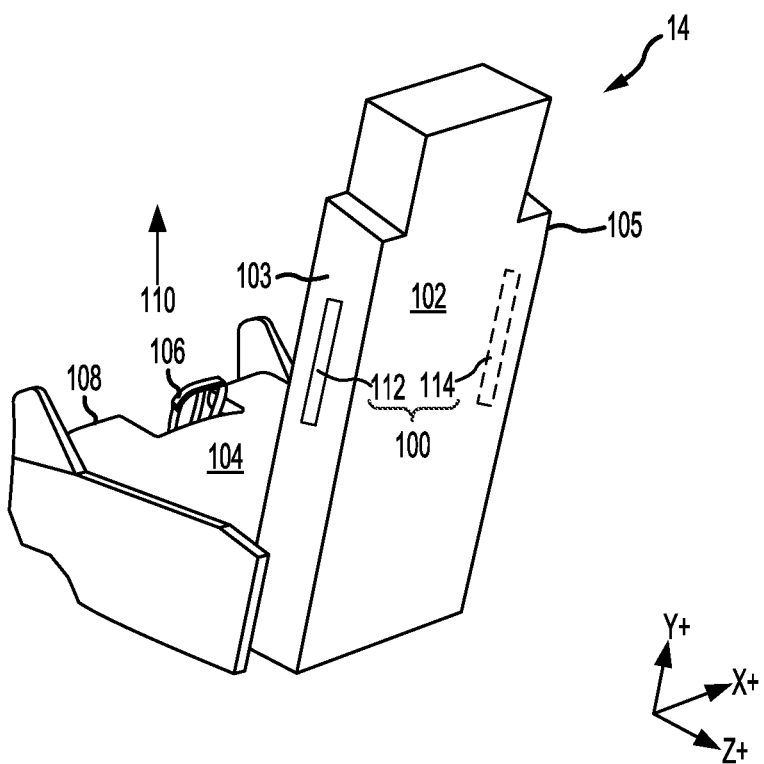
FIG. 1B illustrates an ejection seat having an arm restraint system, in accordance with various embodiments.

With reference to FIG. 1B, ejection seat 14 is illustrated with arm restraint assembly 100 in a non-deployed position, in accordance with various embodiments. Ejection seat 14 includes a seat back 102 and a seat pan 104. In various embodiments, an ejection handle 106 may be located proximate a frontside 108 of seat pan 104. Frontside 108 of seat pan 104 is generally opposite, or distal, seat back 102. While FIG. 1B shows ejection handle 106 located at frontside 108 of seat pan 104, it is further contemplated and understood that ejection handle 106 may be located anywhere that is accessible to an occupant of ejection seat 14. Ejection handle 106 may be configured to initiate an ejection sequence upon actuation. For example, occupant 16 (with momentary reference to FIG. 1A) pulling ejection handle 106 in the direction of arrow 110 by may cause ejection seat 14 to be expelled from the cockpit.

Ejection seat 14 includes arm restraint assembly 100. Arm restraint assembly 100 may include a left (or first) arm restraint 112 and a right (or second) arm restraint 114. Left and right arm restraints 112, 114 may be located at opposing sides of seat back 102. Left arm restraint 112 may be located proximate a left (or first) side panel 103 of seat back 102. Right arm restraint 114 may be located proximate a right (or second) side panel 105 of seat back 102. As described in further detail below, left and right arm restraints 112, 114 may include arms, or struts, configured to pivot relative to seat back 102. Upon initiation of the ejection sequence, the arms of left and right arm restraints 112, 114 pivot, or otherwise rotate, to the deployed position.

With reference to FIGS. 2A and 2B, and continuing reference to FIG. 1B, left arm restraint 112 is illustrated in a non-deployed position, in accordance with various embodiments. In FIG. 2B, left side panel 103 is removed to better illustrate features of left arm restraint 112. While elements and functionalities of left arm restraint 112 are described in relation to FIGS. 2A and 2B, it is further contemplated and understood that right arm restraint 114 is a mirror image of left arm restraint 112 and includes the elements and functionalities as described herein with respect to left arm restraint 112.

Left arm restraint 112 includes a primary (or first) arm 120. In various embodiments, left arm restraint 112 may include a secondary (or second) arm 130. In the non-deployed position, secondary arm 130 may be located between primary arm 120 and a net cover 150 and/or between primary arm 120 and left side panel 103. Net cover 150 may form a portion of seat back 102 (FIG. 1B) and/or may be otherwise attached to seat back 102. In response to deployment of ejection seat 14, primary arm 120 and secondary arm 130 pivot relative to left side panel 103. Primary arm 120 is coupled to seat back 102 (e.g., to left side panel 103) via a primary arm bracket 122. Primary arm bracket 122 may be attached to left side panel 103 via pins, rivets, screws, clips, or any other securement device. Secondary arm 130 is coupled to seat back 102 (e.g., to left side panel 103) via a secondary arm bracket 132. Secondary arm bracket 132 may be attached to left side panel 103 via pins, rivets, screws, clips, or any other securement device. In various embodiments, primary arm bracket 122 and secondary arm bracket 132 are static structures, which do not pivot or otherwise rotate relative to seat back 102.

Primary arm 120 is rotationally coupled to primary arm bracket 122 via a primary arm pivot joint 124. During deployment of left arm restraint 112, primary arm 120 rotates relative to primary arm bracket 122 and about primary arm pivot joint 124. Secondary arm 130 may be rotationally coupled to secondary arm bracket 132 via a secondary arm pivot joint 134. During the deployment of left arm restraint 112, secondary arm 130 rotates relative to secondary arm bracket 132 and about the secondary arm pivot joint 134. In various embodiments, the axis of rotation about which primary arm 120 rotates is not parallel to the axis of rotation about which secondary arm 130 rotates.

In various embodiments, primary arm 120 may include a lock assembly 125 configured to limit a rotation of primary arm 120 about primary arm pivot joint 124. Lock assembly 125 may be configured to lock primary arm 120 in the fully-deployed position. Lock assembly 125 may be configured such that in response to the primary arm 120 rotating a predetermined number of degrees (e.g., 75°, 90°, 110°, etc.), lock assembly 125 prevents, or otherwise blocks, further rotation and prevents from rotating in the opposite direction (i.e., toward secondary arm 130 and left side panel 103). In various embodiments, lock assembly 125 may include a tab 126 coupled to primary arm 120. In various embodiments, tab 126 may be located in an tab opening 127 defined by primary arm 120. Tab 126 is biased in a radially inward direction. Stated differently, tab 126 is biased toward primary arm pivot joint 124. Primary arm bracket 122 may define a tab groove 128. Tab groove 128 is configured to receive tab 126. Locating tab 126 in tab groove 128 generates an interference between tab 126 and primary arm bracket 122, thereby restricting rotation of primary arm 120 about primary arm pivot joint 124. In various embodiments, a location of tab groove 128 in primary arm bracket 122 may be selected such that tab 126 will translate into tab groove 128 when primary arm 120 has rotated a predetermined number of degrees (e.g., 75°, 90°, 110°, etc.).

In accordance with various embodiments, left arm restraint 112 includes a latch 160. Latch 160 is rotationally coupled to primary arm 120 via a latch pivot joint 162. Latch 160 may rotate, relative to primary arm 120, via latch pivot joint 162. A lanyard, or cord, 168 may be attached to a head end 166 of latch 160 and to an anchor, or coupling, 170, with momentary reference to FIG. 3.

Figure 3:
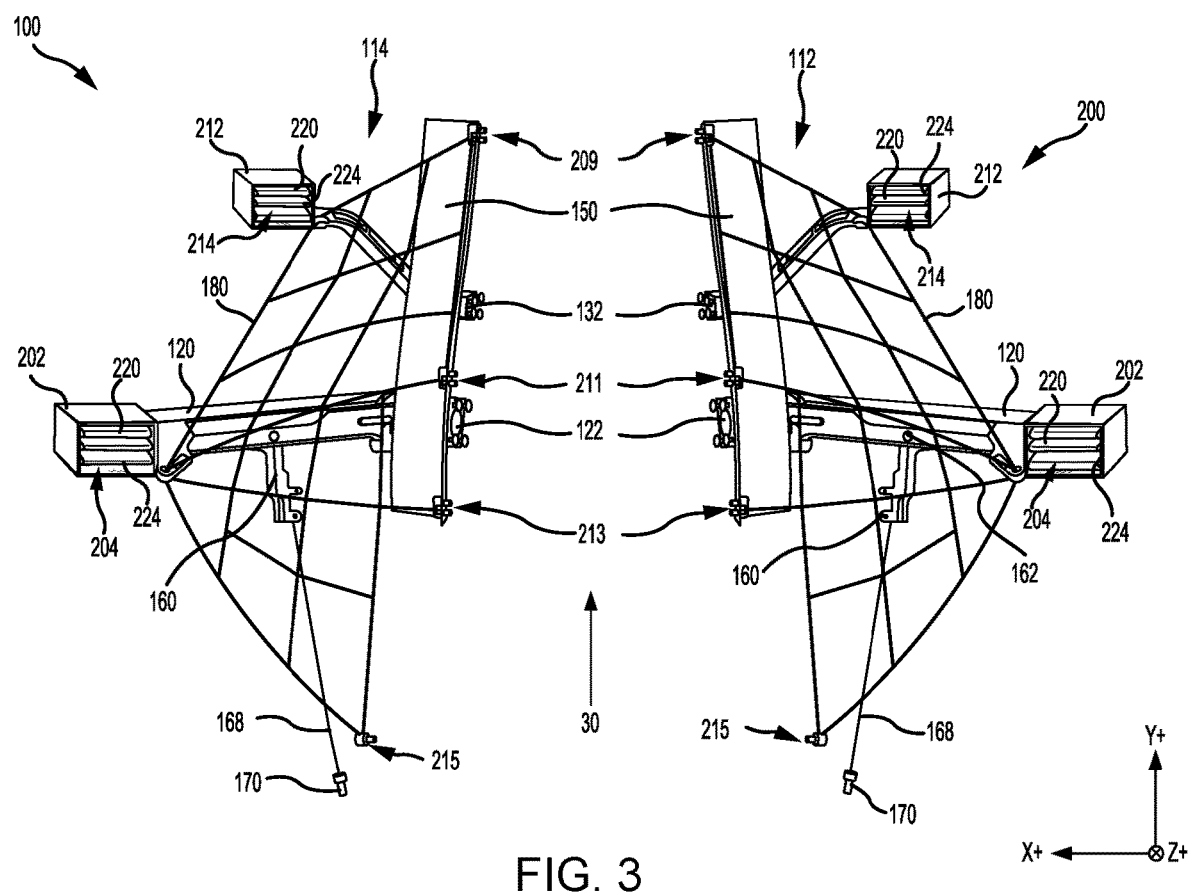
FIG. 3 illustrates an arm restraint assembly in a deployed position and including an airfoil system, in accordance with various embodiments.

With combined reference to FIG. 1A and FIG. 3, anchor 170 is coupled to a stationary structure (e.g., a seat rail, a wall, a floor, etc.) within cockpit 18. In this regard, during expulsion of ejection seat 14 from cockpit 18, ejection seat 14 translates toward canopy 22 (i.e., in the direction of arrow 30), while anchor 170 remains stationary. As ejection seat 14 travels toward canopy 22, the coupling of cord 168 between latch 160 and anchor 170 causes latch 160 to rotate about latch pivot joint 162.

Returning to FIGS. 2A and 2B, latch 160 may include one or more leg(s) 164. In the non-deployed position, legs 164 may extend away from primary arm 120. As primary arm 120 rotates about latch pivot joint 162, head end 166 of latch 160 may rotate away from primary arm 120, while legs 164 rotate toward primary arm 120. Head end 166 of latch 160 may be located opposite, or distal, latch pivot joint 162 and legs 164.

In various embodiments, latch 160 may include a hook portion 174. Hook portion 174 may be located approximately 90°, about latch pivot joint 162, from head end 166 of latch 160. Hook portion 174 may be located approximately 180°, about latch pivot joint 162, from legs 164. In various embodiments, secondary arm 130 may define a secondary latch orifice 176 configured to receive hook portion 174. Primary arm 120 may define a primary latch orifice 178. In the non-deployed position, primary latch orifice 178 may be aligned with secondary latch orifice 176, and hook portion 174 of latch 160 may be located through primary latch orifice 178 and secondary latch orifice 176. When left arm restraint 112 is in the non-deployed position, hook portion 174 may engage, or contact, a secondary arm 130 and secure primary arm 120 to secondary arm 130. Stated differently, an interference generated between hook portion 174 and secondary arm 130 may block and/or prevent rotation of primary arm 120 and secondary arm 130 away from left side panel 103 and seat back (FIG. 1B).

In various embodiments, as latch 160 rotates about latch pivot joint 162, hook portion 174 translates out of secondary latch orifice 176 and primary latch orifice 178, thereby allowing primary arm 120 to separate from (i.e., rotate away from) secondary arm 130. Latch 160 rotates about latch pivot joint 162 until legs 164 contact a latch interference surface of primary arm 120. Legs 164 contacting the latch interference surface prevents further rotation of latch 160. In response to legs 164 contacting the latch interference surface, the load from cord 168 along with the interference between legs 164 of latch 160 and interference surface 172 causes primary arm 120 to rotate about primary arm pivot joint 124. Primary arm 120 rotates about primary arm pivot joint 124 until tab 126 translates into tab groove 128, thereby restricting further rotation of primary arm 120.

Left arm restraint 112 further includes a netting 180. Netting 180 may be coupled to primary arm 120. Netting 180 may comprise rope, ribbon, webbing, string, etc. Netting 180 may be formed from polyaramid paraphenylene terephthalamide (PPTA), nylon, ballistic nylon, polypropylene, polyester, cotton, metal, metal alloy, or other suitable material. In the non-deployed position, netting 180 is located within a net cover 150 (i.e., proximate left side panel 103 of seat back 102, with momentary reference to FIG. 1B). In various embodiments, net cover 150 may define a channel 152. Channel 152 may house portions of netting 180 prior to deployment of left arm restraint 112.

As primary arm 120 rotates about primary arm pivot joint 124, netting 180 is drawn out of channel 152 and away from net cover 150. In various embodiments, a portion of netting 180 may be coupled to secondary arm 130. As primary arm 120 pulls netting 180 out of net cover 150, netting 180 may force secondary arm 130 to rotate away from net cover 150 and seat back 102.

In accordance with various embodiments, left arm restraint 112 includes an airfoil system 200. In various embodiments, airfoil system 200 may include a primary (or first) airfoil structure 202 coupled, or mounted, to primary arm 120. Primary airfoil structure 202 may be mounted to primary arm 120 such that when primary arm 120 is in the fully deployed position (e.g., when tab 126 is located in tab groove 128), an inlet 204 of primary airfoil structure 202 is oriented in a forward direction (i.e., in the negative Z direction), and an outlet 206 of primary airfoil structure 202 is oriented in the aft direction (i.e., in the positive Z direction). In various embodiments, primary airfoil structure 202 may be mounted to an end 121 of primary arm 120 that is opposite primary arm bracket 122.

In various embodiments, airfoil system 200 may include a secondary (or second) airfoil structure 212 in place of or in addition to primary airfoil structure 202. Secondary airfoil structure 212 may be coupled, or mounted, to secondary arm 130. Secondary airfoil structure 212 may be mounted to secondary arm 130 such that when left arm restraint 112 is in the fully deployed position (e.g., when tab 126 is located in tab groove 128), an inlet 214 of secondary airfoil structure 212 is oriented in the forward direction and an outlet 216 of secondary airfoil structure 212 is oriented in the aft direction (i.e., in the positive Z direction). In various embodiments, secondary airfoil structure 212 may be mounted to an end 131 of secondary arm 130 that is opposite secondary arm bracket 132.

Figure 4:
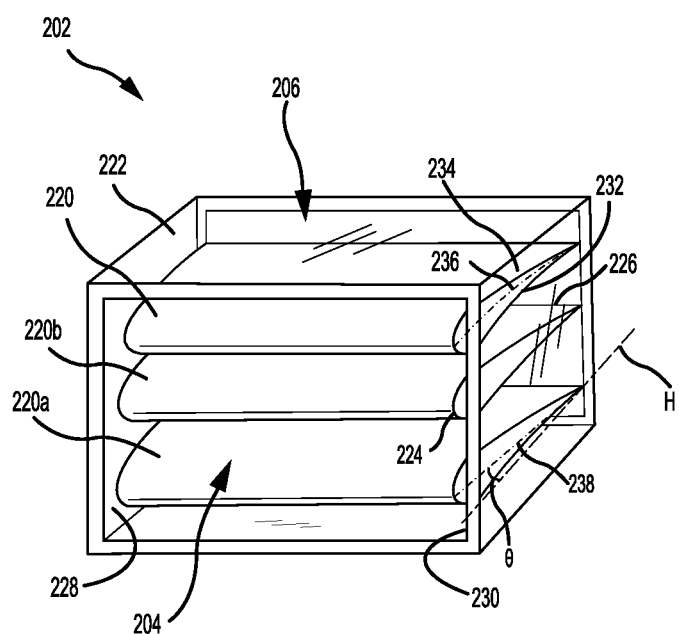
FIG. 4 illustrates an airfoil assembly for an arm restraint assembly, in accordance with various embodiments.

With reference to FIG. 4, primary airfoil structure 202 is illustrated. While elements and functionalities of primary airfoil structure 202 are described in relation to FIG. 4, it is further contemplated and understood that secondary airfoil structure 212 may include the elements and functionalities as described herein with respect to primary airfoil structure 202.

In accordance with various embodiments, primary airfoil structure 202 includes one or more airfoil body(s) 220. In various embodiments, airfoil bodies 220 may be located within a housing 222 of primary airfoil structure 202. Housing 222 may define inlet 204 and outlet 206. In various embodiments, housing 222 may comprise a generally cubic or rectangular shape. Airfoil bodies 220 are positioned between inlet 204 and outlet 206.

In various embodiments, each airfoil body 220 may include a leading edge 224 and trailing edge 226 opposite the leading edge 224. Leading edge 224 and trailing edge 226 may extend from a first interior wall 228 of housing 222 to a second interior wall 230 of housing 222. Second interior wall 230 may be oriented toward first interior wall 228. Leading edge 224 may be located proximate, or closer to, inlet 204 as compared to trailing edge 226. Each airfoil body 220 may further include a pressure side 232 having a generally concave shape, and a suction side 234 having a generally convex shape. Pressure side 232 and suction side 234 are joined together at the respective leading edge 224 and trailing edge 226. Airfoil bodies 220 may be fabricated from titanium, a titanium alloy, aluminum, aluminum alloy, composite material, or other suitable structural material(s).

Airfoil bodies 220 each include a camber 236. The camber 236 is defined as a line extending from the leading edge 224 to the trailing edge 226 and located midway between (i.e., equal distance from) pressure side 232 and suction side 234. Airfoil bodies 220 each include a chord 238. Chord 238 is defined as a straight line joining the leading edge 224 and trailing edge 226. An angle of incidence or "attack angle" of airfoil body 220 is the angle ($\theta$) of the chord 238 of the airfoil body 220 relative to a horizontal plane H. As used herein, a horizontal plane refers to a plane perpendicular to the direction of gravity.

The parameters of airfoil bodies 220 (e.g., the camber, chord, attack angle, leading edge angle, trailing edge angle, etc.) are selected, or designed, to aid in stabilization (e.g., reduce pitch and yaw) and/or lift of the ejection seat. Airfoil bodies 220 may be configured to utilize Bernoulli's principle to stabilize the ejection seat. In this regard, the orientation and shape of airfoil bodies 220 may be selected such that air will flow over the pressure side 232 and the suction side 234 of airfoil body 220 at different velocities, thereby aiding in lift and/or stabilization of the ejection seat. In various embodiments, primary airfoil structure 202 may include airfoil bodies 220 of varied orientation and/or varied shape. For example, the attack angle of a first airfoil body 220a may be different from the attack angle of a second airfoil body 220b. In various embodiments, a camber of first airfoil body 220a may be different from a camber of second airfoil body 220b.

Referring now to FIG. 3, arm restraint assembly 100 is illustrated with left and right arm restraints 112, 114 in the fully-deployed position. Seat back 102 and seat pan 104 have been removed from FIG. 3 for clarity and to illustrate the features of arm restraint assembly 100. Netting 180 is drawn taut between primary arm 120 and one or more netting brackets, for example, via netting brackets 209, 211, 213, 215. In various embodiments, netting 180 may be coupled to ejection seat 14 via netting brackets 209, 211, 213, 215. In various embodiments, netting brackets 209, 211, 213 may be attached to seat back 102, with momentary reference to FIG. 1B, and netting bracket 215 may be attached to seat pan 104. Netting brackets 209, 211, 213, 215 may be attached to ejection seat 14 via pins, rivets, screws, clips, or any other securement device. In the fully-deployed position, netting 180 may restrict rearward arm movement of the arms of occupant 16, with momentary reference to FIG. 1A.

In accordance with various embodiments, as ejection seat 14 translates out of cockpit 18, cord 168 separates from latch 160. In various embodiments, cord 168 is configured to separate from latch 160 after primary arm 120 locks and as ejection seat 14 continues to translate away from anchor 170 (i.e., in the direction of arrow 30). For example, cord 168 may sever or a sheer pin coupling cord 168 to latch 160 may sheer. In this regard, a tensile strength of cord 168 and/or the sheer pin may be less than the tensile strength of latch 160 and/or less than the force of the interference created by tab 126 being located in tab groove 128, with momentary reference to FIG. 2A.

Airfoil system 200 includes a primary airfoil structure 202 coupled, or mounted, to the primary arm 120 of each of left arm restraint 112 and right arm restraint 114. Primary airfoil structures 202 may be mounted to primary arms 120 such that when left and right arm restraints 112, 114 are in the fully deployed position, inlets 204 are oriented forward. In this regard, the leading edges 224 of airfoil bodies 220 are oriented forward. In various embodiments, airfoil system 200 may include a secondary airfoil structure 212 coupled, or mounted, to the secondary arm 130 of each of left arm restraint 112 and right arm restraint 114. Secondary airfoil structures 212 may be mounted to secondary arms 130 such that when left and right arm restraints 112, 114 are in the fully deployed position, inlets 214 are oriented forward. In this regard, the leading edges 224 of airfoil bodies 220 of secondary airfoil structures 212 are oriented forward.

Airfoil bodies 220 may reduce the rotation (e.g., changes in pitch, yaw, roll, etc.) upon the ejection seat entering the windblast. Stabilizing the ejection seat tends to increase occupant safety, as reducing the amount of pitch, roll, and/or yaw, which can have negative effects on the neck and limbs of the occupant, reduces the possibility for occupant injury. Airfoil bodies 220 may be oriented for directional control of the ejection seat. Increased stability and directional control may reduce the risk of the ejection seat colliding with a second ejection seat (e.g., a copilot's ejection seat), the tail of the aircraft, or other debris. Stabilizing the ejection seat may also reduce the occurrences of neck injury or whiplash induced by the drogue parachute loads. In various embodiments, airfoil bodies 220 may also aid in the lift (translation in the positive Y direction) of the ejection seat. In various embodiments, the stabilization and/or lift generated by airfoil bodies 220 may allow a drogue parachute to be eliminated from the ejection system. Eliminating the drogue parachute tends to reduce the weight and/or the cost of the ejection system and removes the possibility of occupant injury from loads generated during deployment of the drogue parachute.

Figure 5:
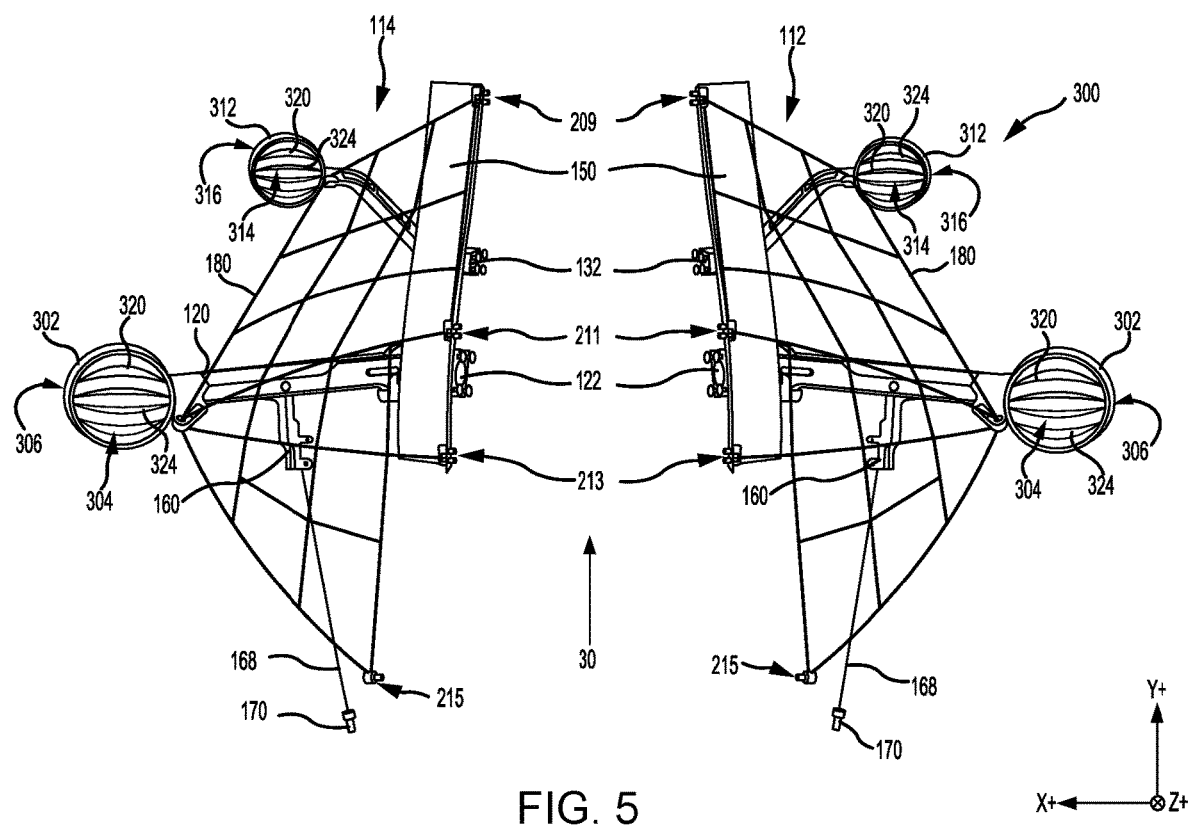
FIG. 5 illustrates an arm restraint assembly in a deployed position and including an airfoil system, in accordance with various embodiments.

With reference to FIG. 5, arm restraint assembly 100 including an airfoil system 300 is illustrated with left and right arm restraints 112, 114 in the deployed position. In various embodiments, with momentary reference to FIG. 4, arm restraint assembly 100 may include airfoil system 300 in place of airfoil system 200. Seat back 102 and seat pan 104 have been removed from FIG. 5 for clarity and to illustrate the features of arm restraint assembly 100.

Airfoil system 300 includes a primary airfoil structure 302 coupled, or mounted, to the primary arm 120 of each of left arm restraint 112 and right arm restraint 114. Primary airfoil structures 302 may be mounted to primary arms 120 such that when left and right arm restraints 112, 114 are in the fully deployed position, an inlet 304 of the primary airfoil assembly is oriented forward (i.e., in the negative Z direction) and an outlet 306 of the primary airfoil structure 302 is oriented in the aft direction (i.e., in the positive Z direction). In various embodiments, primary airfoil structures 302 may be mounted to an end 121 of the primary arm 120 that is opposite primary arm bracket 122.

In various embodiments, airfoil system 300 may further include a secondary (or second) airfoil structure 312 in place of or in addition to primary airfoil structure 302. Secondary airfoil structures 312 may be coupled, or mounted, to the secondary arm 130 of each of left arm restraint 112 and right arm restraint 114. Secondary airfoil structures 312 may be mounted to secondary arms 130 such that when left and right arm restraints 112, 114 are in the fully deployed position, an inlet 314 of the secondary airfoil structure 312 is oriented forward. In various embodiments, secondary airfoil structures 312 may be mounted to end 131 of the secondary arm 130 that is opposite secondary arm bracket 132.

With reference to FIG. 6A, a primary airfoil structure 302 is illustrated, respectively. While elements and functionalities of primary airfoil structure 302 are described in relation to FIGS. 6A and 6B, it is further contemplated and understood that secondary airfoil structures 312, in FIG. 5, may include the elements and functionalities as described herein with respect to primary airfoil structure 302.

In accordance with various embodiments, primary airfoil structure 302 includes one or more airfoil body(s), such as airfoil body 320a, airfoil body 320b, airfoil body 320c, and airfoil body 320d. In various embodiments, airfoil bodies 320a, 320b, 320c, 320d may be located within a housing 322 of primary airfoil structure 302. Housing 322 may define inlet 304 and outlet 306. In various embodiments, housing 322 may comprise a generally cylindrical shape. Airfoil bodies 320a, 320b, 320c, 320d are positioned between inlet 304 and outlet 306.

With reference to FIG. 6B, an airfoil body 320 of primary airfoil structure 302 is illustrated. In various embodiments, airfoil body 320 may include a leading edge 324 and trailing edge 326 opposite the leading edge 224. Leading edge 324 and trailing edge 326 may extend between opposing point on an interior wall 328 of housing 322. Leading edge 324 may be located proximate, or closer to, inlet 304 as compared to trailing edge 326. Each airfoil body 320 may further include a pressure side 332 having a generally concave shape, and a suction side 334 having a generally convex shape. Pressure side 332 and suction side 334 may extend between leading edge 324 and trailing edge 326. Airfoil bodies 320 may be fabricated from titanium, a titanium alloy, aluminum, aluminum alloy, composite material, or other suitable structural material(s).

With combined reference to FIGS. 6A and 6B, in various embodiments, pressure side 332 and suction side 334 may be curved about a center axis C of housing 322. Center axis C may extend in a forward to aft direction. In various embodiments, the pressure side 332 of the airfoil bodies 320a, 320b, 320c, 320d may be oriented toward center axis C. In various embodiments, the pressure side 332 of one or more airfoil bodies 320 is oriented toward the pressure side 332 of another airfoil body 320. For example, in various embodiments, the pressure sides 332 of airfoil bodies 320a, 320b are oriented toward the pressure sides 332 of airfoil bodies 320c, 320d.

The parameters of airfoil bodies 320a, 320b, 320c, 320d are selected, or designed, to aid in stabilization (e.g., reduce pitch, yaw, roll) and/or in lift of the ejection seat. Airfoil bodies 320a, 320b, 320c, 320d may be configured to utilize Bernoulli's principle to stabilize the ejection seat. In this regard, the orientation and shape of airfoil bodies 320a, 320b, 320c, 320d may be selected such that air will flow over the pressure side 332 and the suction side 334 of each airfoil body 320a at different velocities, thereby aiding in lift and/or stabilization of the ejection seat. In various embodiments, primary airfoil structure 302 may include airfoil bodies 320 of varied orientation and/or varied shape. For example, in various embodiments, a radius of curvature of the pressure side 332 and/or suction side 334 of airfoil body 320a is different from the radius of curvature of the pressure side 332 and/or the suction side 334 of airfoil body 320b. In various embodiments, airfoil body 320c and airfoil body 320d may be mirror images of airfoil body 320b and airfoil body 320a, respectively.

Returning to FIG. 5, primary airfoil structures 302 and secondary airfoil assemblies are mounted to primary arms 120 and secondary arms 130, respectively, such that when left and right arm restraints 112, 114 are in the fully deployed position, the leading edges 324 of airfoil bodies 320 are oriented forward. In various embodiments, airfoil system 300 may include one or more of primary airfoil structures 202, from FIG. 4, in place of one or more of the primary airfoil structures 302 and/or one or more of the secondary airfoil structures 212, from FIG. 3, in place of one or more of the secondary airfoil structures 312.

Airfoil bodies 320 may reduce the rotation (e.g., changes in pitch, yaw, roll, etc.) upon the ejection seat entering the windblast. Stabilizing the ejection seat tends to increase occupant safety, as reducing the amount of pitch, roll, and/or yaw, which can have negative effects on the neck and limbs of the occupant, reduces the possibility for occupant injury. Airfoil bodies 320 may be oriented for directional control of the ejection seat. Increased stability and directional control may reduce the risk of the ejection seat colliding with a second ejection seat (e.g., a copilot's ejection seat), the tail of the aircraft, or other debris. Stabilizing the ejection seat may also reduce the occurrences of neck injury or whiplash induced by the drogue parachute loads. In various embodiments, airfoil bodies 320 may also aid in the lift (translation in the positive Y direction) of the ejection seat. In various embodiments, the stabilization and/or lift generated by airfoil bodies 320 may allow a drogue parachute to be eliminated from the ejection system. Eliminating the drogue parachute tend to reduce the weight and/or the cost of the ejection system and removes the possibility of occupant injury from loads generated during deployment of the drogue parachute.

Figure 7A:
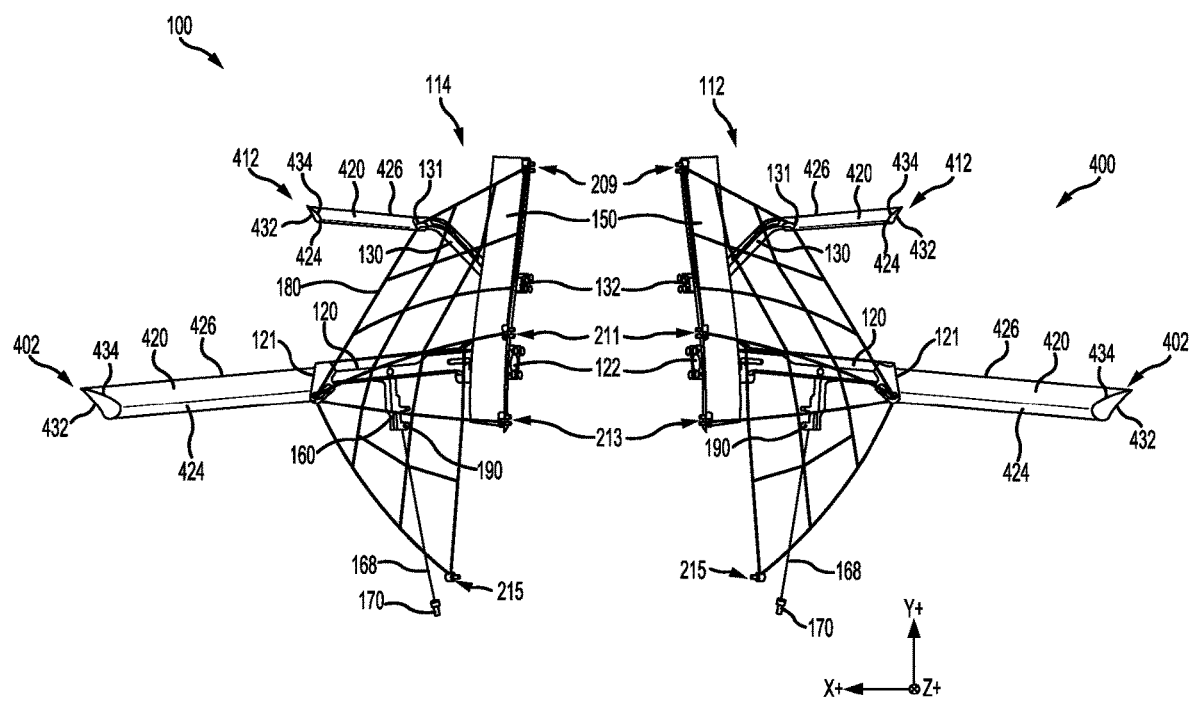
FIGS. 7A and 7B illustrate an arm restraint assembly in a fully-deployed position and a non-deployed position, respectively, and including an airfoil system, in accordance with various embodiments.
Figure 7B:
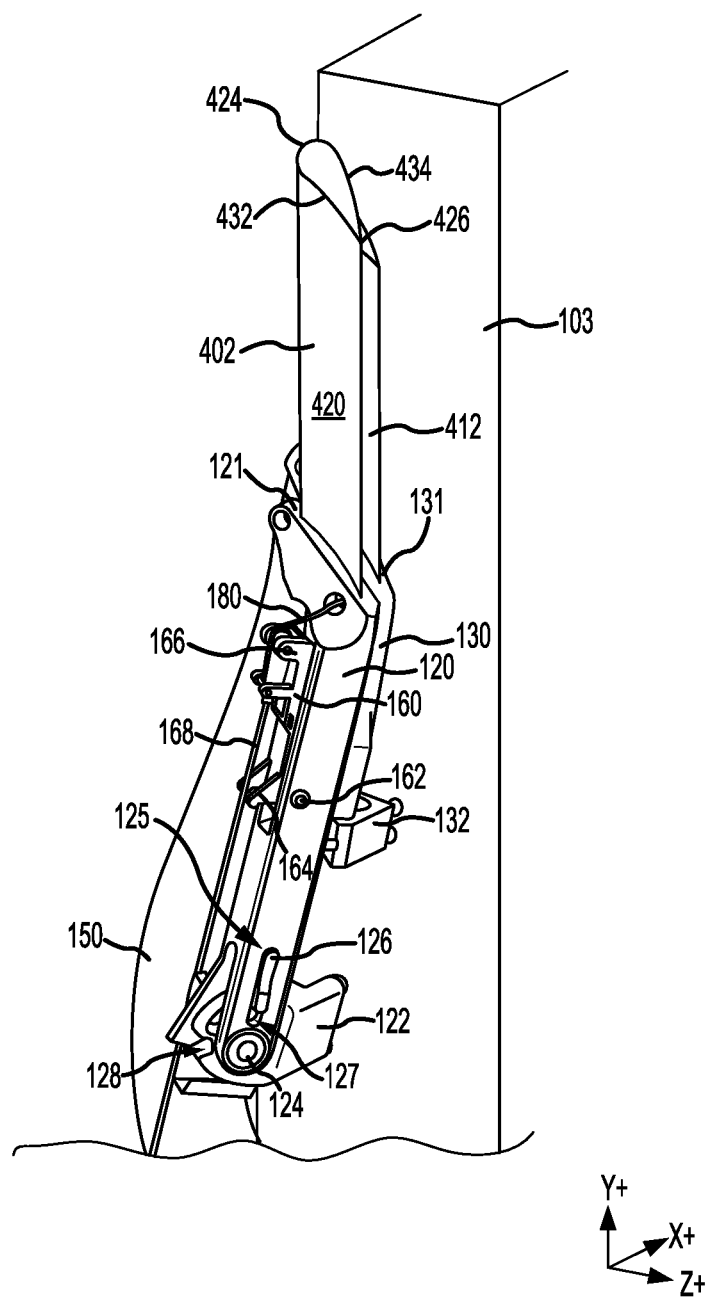

With reference to FIG. 7A, arm restraint assembly 100 including an airfoil system 400 is illustrated with left and right arm restraints 112, 114 in the deployed position. In various embodiments, with momentary reference to FIG. 3, arm restraint assembly 100 may include airfoil system 400 in place of airfoil system 200. Seat back 102 and seat pan 104 have been removed from FIG. 7A for clarity and to illustrate the features of arm restraint assembly 100. In FIG. 7B, left arm restraint 112 is illustrated in the non-deployed position, in accordance with various embodiments. While elements and functionalities of left arm restraint 112 are described in relation to FIG. 7B, it is further contemplated and understood that right arm restraint 114 is a mirror image of left arm restraint 112 and includes the elements and functionalities as described herein with respect to left arm restraint 112.

With combined reference to FIGS. 7A and 7B, airfoil system 400 includes a primary airfoil structure 402 coupled, or mounted, to the primary arm 120 of each of left arm restraint 112 and right arm restraint 114, and a secondary airfoil structure 412 coupled, or mounted, to the secondary arm 130 of each of left arm restraint 112 and right arm restraint 114. Primary airfoil structure 402 may be mounted to end 121 of the primary arm 120. Secondary airfoil structure 412 may be mounted to end 131 of the secondary arm 130.

Primary airfoil structures 402 and secondary airfoil structures 412 each include an airfoil body 420 having a leading edge 424 and a trailing edge 426 opposite the leading edge 424. Primary airfoil structures 402 may be mounted to primary arms 120 such that when primary arms 120 rotate to the fully deployed position (shown in FIG. 7A), leading edge 424 of airfoil body 420 is oriented forward. Secondary airfoil structures 412 may be mounted to secondary arms 130 such that when secondary arms 130 rotate to the fully deployed position (shown in FIG. 7A), the leading edge 424 of the airfoil body is oriented forward.

The airfoil body 420 of primary airfoil structures 402 and secondary airfoil structures 412 further includes a pressure side 432 having a generally concave shape, and a suction side 434 having a generally convex shape. Pressure side 432 and suction side 434 are joined together at the respective leading edge 424 and trailing edge 426. The airfoil body 420 of primary airfoil structures 402 and secondary airfoil structures 412 be fabricated from titanium, a titanium alloy, aluminum, aluminum alloy, composite material, or other suitable structural material(s). In various embodiments, primary airfoil structure 402 may be integral to primary arm 120, such that primary arm 120 and primary airfoil structure 402 are formed from a single, monolithic member. In various embodiments, secondary airfoil structure 412 may be integral to secondary arm 130, such that secondary arm 130 and secondary airfoil structure 412 are formed from a single, monolithic member.

The parameters of primary and secondary airfoil structures 402, 412 (e.g., the camber, chord, attack angle, leading edge angle, trailing edge angle, etc. of airfoil body 420) are selected, or designed, to aid in stabilization (e.g., reduce pitch, yaw, rolling, etc.) and/or lift of the ejection seat. Primary and secondary airfoil structures 402, 412 may be configured to utilize Bernoulli's principle to stabilize the ejection seat. In this regard, the orientation and shape of airfoil bodies 420 may be selected such that air flow will over the pressure side 432 and the suction side 434 at different velocities, thereby aiding in lift and/or stabilization of the ejection seat.

In various embodiments, primary airfoil structures 402 and secondary airfoil structures 412 may include airfoil bodies 420 of varied orientation and/or varied shape. For example, the attack angle of the airfoil bodies 420 of primary airfoil structures 402 may be different from the attack angle of the airfoil bodies 420 of secondary airfoil structures 412. In various embodiments, a camber of the airfoil bodies 420 of primary airfoil structures 402 may be different from a camber of the airfoil bodies 420 of secondary airfoil structures 412.

In various embodiments, airfoil system 400 may include one or more of primary airfoil structures 202, from FIG. 4 and/or one or more of primary airfoil structures 302, from FIG. 6, in place of one or more of the primary airfoil structure(s) 402, and/or one or more of the secondary airfoil structures 212, from FIG. 3, and/or one or more of the secondary airfoil structures 312, from FIG. 5, in place of one or more of the secondary airfoil structure(s) 412.

Primary and secondary airfoil structures 402, 412 may reduce the rotation (e.g., changes in pitch, yaw, roll, etc.) upon the ejection seat entering the windblast. Stabilizing the ejection seat tends to increase occupant safety, as reducing the amount of pitch, roll, and/or yaw, which can have negative effects on the neck and limbs of the occupant, reduces the possibility for occupant injury. Primary and secondary airfoil structures 402, 412 may be oriented for directional control of the ejection seat. Increased stability and directional control may reduce the risk of the ejection seat colliding with a second ejection seat (e.g., a copilot's ejection seat), the tail of the aircraft, or other debris. Stabilizing the ejection seat may also reduce the occurrences of neck injury or whiplash induced by the drogue parachute loads. In various embodiments, primary and secondary airfoil structures 402, 412 may also aid in the lift (translation in the positive Y direction) of the ejection seat. In various embodiments, the stabilization and/or lift generated by primary and secondary airfoil structures 402, 412 may allow a drogue parachute to be eliminated from the ejection system. Eliminating the drogue parachute tends to reduce the weight and/or the cost of the ejection system and removes the possibility of occupant injury from loads generated during deployment of the drogue parachute.

Figure 8A:
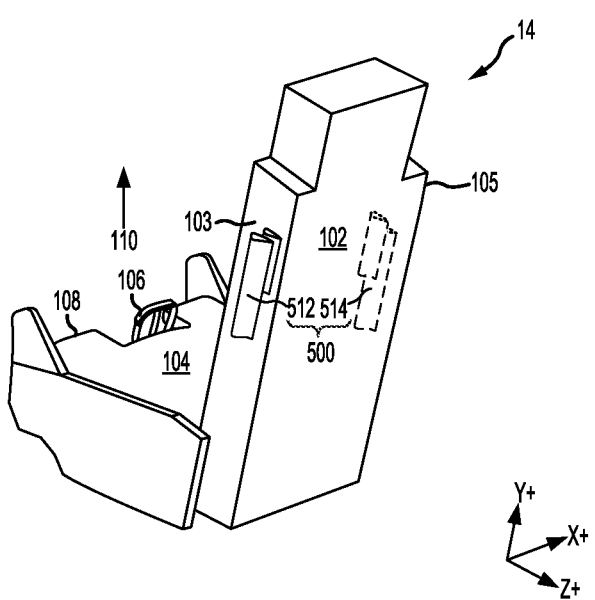
FIG. 8A illustrates an ejection seat having an arm restraint assembly, in accordance with various embodiments.

With reference to FIG. 8A, ejection seat 14 is illustrated with an arm restraint assembly 500 in a non-deployed position, in accordance with various embodiments. In various embodiments, ejection seat 14 includes arm restraint assembly 500 in place of arm restraint assembly 100 in FIG. 1B.

Arm restraint assembly 500 may include a left (or first) arm restraint 512 and a right (or second) arm restraint 514. Left and right arm restraints 512, 514 may be located at opposing sides of seat back 102. Left arm restraint 512 may be located proximate left side panel 103 of seat back 102. Right arm restraint 514 may be located proximate right side panel 105 of seat back 102. As described in further detail below, left and right arm restraints 512, 514 may include arms, or struts, configured to pivot relative to seat back 102. Upon initiation of the ejection sequence, the arms of left and right arm restraints 512, 514 pivot, or otherwise rotate, to the deployed position.

Figure 8B:
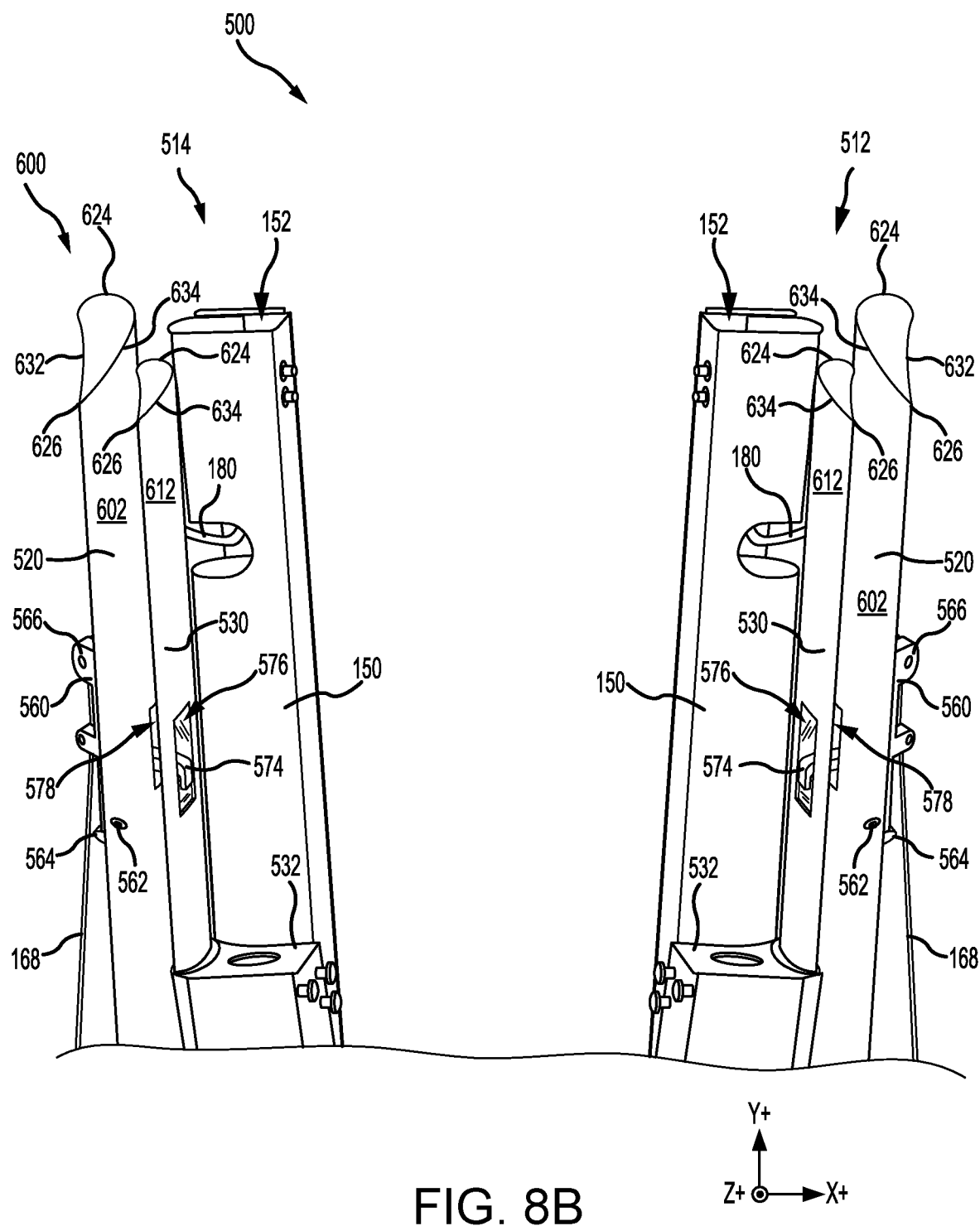
FIG. 8B illustrates an arm restraint assembly in a non-deployed position and including an airfoil system, in accordance with various embodiments.
Figure 8C:
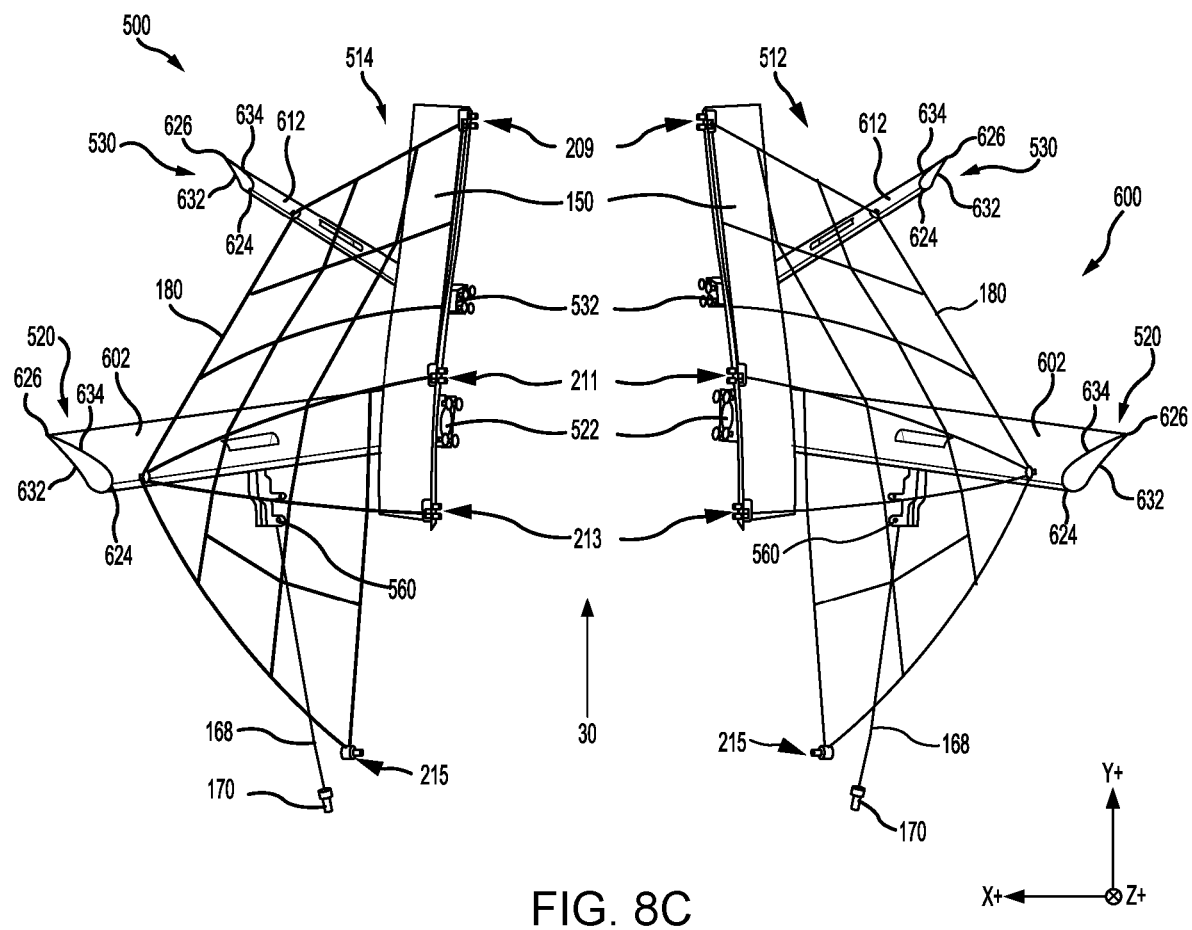
FIG. 8C illustrates an arm restraint in a deployed position and including an airfoil system, in accordance with various embodiments.

Referring now to FIGS. 8B and 8C, and with continuing reference to FIG. 8A, left and right arm restraints 512, 514 are illustrated in a non-deployed position and a deployed position, respectively. In FIGS. 8B and 8C, seat back 102 and seat pan 104 are removed to better illustrate the features of left and right arm restraints 512, 514.

Left and right arm restraints 512, 514 may each include a primary (or first) arm 520 shaped as an airfoil, and a secondary (or second) arm 530 shaped as an airfoil. Stated differently, primary arm 520 (also referred to as primary airfoil 520) comprises an airfoil body 602 and secondary (also referred to as secondary airfoil 530) comprises an airfoil body 612. In the non-deployed position, secondary airfoil 530 may be located between primary airfoil 520 and net cover 150 and/or between primary airfoil 520 and seat back 102 (FIG. 8A). Net cover 150 may form a portion of seat back 102 (FIG. 8A) and/or may be otherwise attached to seat back 102. In response to deployment of ejection seat 14, the primary airfoil 520 and the secondary airfoil 530 of left arm restraint 512 pivot relative to and away from left side panel 103 (FIG. 8A), and the primary airfoil 520 and the secondary airfoil 530 of right arm restraint 514 pivot relative to and away from right side panel 105. Primary airfoil 520 is coupled to seat back 102 (e.g., to left side panel 103) via a primary arm bracket 522. Primary airfoil 520 is configured to pivot about a primary arm pivot joint, similar to primary arm pivot joint 124 in FIG. 2A. Secondary airfoil 530 is configured to pivot about a secondary arm pivot joint, similar to secondary arm pivot joint 134 in FIG. 2A. Primary arm bracket 522 may be attached to left side panel 103 via pins, rivets, screws, clips, or any other securement device. Secondary airfoil 530 is coupled to seat back 102 (e.g., to left side panel 103) via a secondary arm bracket 532. Secondary arm bracket 532 may be attached to left side panel 103 via pins, rivets, screws, clips, or any other securement device. In various embodiments, primary arm bracket 522 and secondary arm bracket 532 are static structures, which do not pivot or otherwise rotate relative to seat back 102.

Primary airfoils 520 are rotationally coupled to primary arm brackets 522. During deployment of left and right arm restraints 512, 514, primary airfoils 520 rotate relative to primary arm brackets 522. In this regard, primary airfoils 520 pivot relative to seat back 102. Secondary airfoils 530 may be rotationally coupled to secondary arm brackets 532. During the deployment of left and right arm restraints 512, 514, secondary airfoils 530 rotate relative to secondary arm brackets 532. In various embodiments, the axis of rotation about which primary airfoils 520 rotates is not parallel to the axis of rotation about which secondary airfoils 530 rotates.

In various embodiments, primary airfoils 520 may include a lock assembly configured to limit a rotation of primary airfoils 520, similar to lock assembly 125, in FIG. 2A. In accordance with various embodiments, a latch 560, similar to latch 160 in FIG. 2A, is rotationally coupled to each of the primary airfoils 520 via a latch pivot joint 562. Latch 560 may rotate, relative to primary airfoil 520, via latch pivot joint 562. A lanyard, or cord, 168 may be attached to a head end 566 of latch 560 and to anchor 170.

During expulsion of ejection seat 14, ejection seat 14 translates toward in the direction of arrow 30, while anchor 170 remains stationary. As ejection seat 14 travels toward in the direction of arrow 30, the coupling of cord 168 between latch 560 and anchor 170 causes latch 560 to rotate about latch pivot joint 562.

In various embodiments, latch 560 may include a hook portion 574. Hook portion 574 may be located approximately 90°, about latch pivot joint 562, from head end 566 of latch 560. In various embodiments, secondary airfoils 530 may define a secondary latch orifice 576 configured to receive hook portion 574. Primary airfoils 520 may define a primary latch orifice 578. In the non-deployed position, primary latch orifice 578 may be aligned with secondary latch orifice 576, and hook portion 574 of latch 560 may be located through primary latch orifice 578 and secondary latch orifice 576. When left and right arm restraints 512, 514 are in the non-deployed position, hook portion 574 may engage, or contact, secondary airfoil 530 and secure primary airfoil 520 to secondary airfoil 530. Stated differently, an interference generated between hook portion 574 and secondary airfoil 530 may block and/or prevent rotation of primary airfoil 520 and secondary airfoil 530 away from left side panel 103 and seat back 102 (FIG. 8A).

In various embodiments, as latch 560 rotates about latch pivot joint 562, hook portion 574 translates out of secondary latch orifice 576 and primary latch orifice 578, thereby allowing primary airfoil 520 to separate from (i.e., rotate away from) secondary airfoil 530. Latch 560 rotates about latch pivot joint 562 until legs contact a latch interference surface of primary airfoil 520. Legs 564 contacting the latch interference surface prevents further rotation of latch 560. In response to legs 564 contacting the latch interference surface, the load from cord 168 along with the interference generated by legs 564 causes primary airfoil 520 to rotate.

Left and right arm restraints 512, 514 further includes netting 180. Netting 180 may be coupled to primary airfoil 520. Netting 180 may comprise rope, ribbon, webbing, string, etc. Netting 180 may be formed from PPTA, nylon, ballistic nylon, polypropylene, polyester, cotton, metal, metal alloy, or other suitable material. In the non-deployed position, netting 180 is located within net cover 150 (i.e., proximate left side panel 103 of seat back 102, with momentary reference to FIG. 1B). In various embodiments, net cover 150 may define channel 152. Channel 152 may house portions of netting 180 prior to deployment of left and right arm restraints 512, 514.

Arm restraint assembly 500 includes an airfoil system 600. In accordance with various embodiments, primary airfoils 520 comprise primary (or first) airfoil bodies 602 of airfoil system 600 and secondary airfoils 530 comprise secondary airfoil bodies 612 of airfoil system 600. In this regard, primary airfoils 520 and secondary airfoils 530 each include a leading edge 624 and a trailing edge 626 opposite the leading edge 624. Primary and secondary airfoils 520, 530 are configured such that when primary and secondary airfoils 520, 530 rotate to the fully deployed position (shown in FIG. 8C), leading edges 624 of primary and secondary airfoils 520, 530 are oriented forward.

Primary and secondary airfoils 520, 530 each further include a pressure side 632 having a generally concave shape, and a suction side 634 having a generally convex shape. Pressure side 632 and suction side 634 are joined together at the respective leading edge 624 and trailing edge 626. Primary and secondary airfoils 520, 530 may each be fabricated from titanium, a titanium alloy, aluminum, aluminum alloy, composite material, or other suitable structural material(s).

The parameters of primary and secondary airfoils 520, 530 (e.g., the camber, chord, attack angle, leading edge angle, trailing edge angle, etc.) are selected, or designed, to aid in stabilization (e.g., reduce pitch, yaw, rolling, etc.) and/or lift of ejection seat 14. Primary and secondary airfoils 520, 530 may be configured to utilize Bernoulli's principle to stabilize the ejection seat 14. In this regard, the orientation and shape of primary and secondary airfoils 520, 530 may be selected such that air flow will over the pressure side 632 and the suction side 634 of the airfoil body at different velocities, thereby aiding in lift and/or stabilization of the ejection seat 14.

In various embodiments, the orientation and/or the shape of primary airfoils 520 may vary relative to secondary airfoils 530. For example, the attack angle of primary airfoils 520 may be different from the attack angle of secondary airfoils 530. In various embodiments, a camber of primary airfoils 520 may be different from a camber of secondary airfoils 530.

In various embodiments, airfoil system 600 may include one or more of primary airfoil structures 202, from FIG. 4, and/or one or more of primary airfoil structures 302, from FIG. 6, and/or one or more of primary airfoil structures 402 in FIG. 7A, in place of or attached to one or more of the primary airfoil body(s) 602; and/or one or more of the secondary airfoil structures 212, from FIG. 3, and/or one or more of the secondary airfoil structures 312, from FIG. 5, and/or one or more of secondary airfoil structures 412 in place of or attached to one or more of the secondary airfoil body(s) 612.

Netting 180 may be coupled to primary airfoils 520. In various embodiments, netting 180 may be attached to leading edge 624 of primary airfoils 520. As primary airfoils 520 rotate relative to primary arm bracket 522, netting 180 may be drawn out of net cover 150. In various embodiments, a portion of netting 180 may be coupled to secondary airfoils 530. For example, netting 180 may be attached to leading edge 624 of secondary airfoils 530. As primary airfoils 520 pull netting 180 out of net cover 150, netting 180 may force secondary airfoils 530 to rotate away from net cover 150 and seat back 102.

Primary and secondary airfoils 520, 530 may reduce the rotation (e.g., changes in pitch, yaw, roll, etc.) upon the ejection seat entering the windblast. Stabilizing the ejection seat tends to increase occupant safety, as reducing the amount of pitch, roll, and/or yaw, which can have negative effects on the neck and limbs of the occupant, reduces the possibility for occupant injury. Primary and secondary airfoils 520, 530 may be oriented for directional control of the ejection seat. Increased stability and directional control may reduce the risk of the ejection seat colliding with a second ejection seat (e.g., a copilot's ejection seat), the tail of the aircraft, or other debris. Stabilizing the ejection seat may also reduce the occurrences of neck injury or whiplash induced by the drogue parachute loads. In various embodiments, primary and secondary airfoils 520, 530 may also aid in the lift (translation in the positive Y direction) of the ejection seat. In various embodiments, the stabilization and/or lift generated by primary and secondary airfoils 520, 530 may allow a drogue parachute to be eliminated from the ejection system. Eliminating the drogue parachute tends to reduce the weight and/or the cost of the ejection system and removes the possibility of occupant injury from loads generated during deployment of the drogue parachute.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An arm restraint assembly for an ejection seat, comprising:
   a primary arm configured to pivot about a primary arm pivot joint;
   a secondary arm configured to pivot about a secondary arm pivot joint; and
   a primary airfoil structure coupled to the primary arm, the primary airfoil structure including a first airfoil body.

2. The arm restraint assembly of claim 1, wherein the primary airfoil structure is coupled to an end of the primary arm opposite the primary arm pivot joint.

3. The arm restraint assembly of claim 1, wherein the primary airfoil structure further includes:
   a housing defining an inlet and an outlet of the primary airfoil structure; and
   a plurality of airfoil bodies located within the housing, the plurality of airfoil bodies including the first airfoil body and a second airfoil body.

4. The arm restraint assembly of claim 3, wherein at least one of a first camber of the first airfoil body is different from a second camber of the second airfoil body or a first attack angle of the first airfoil body is different from a second attack angle of the second airfoil body.

5. The arm restraint assembly of claim 4, wherein a first pressure side of the first airfoil body is oriented toward a second pressure side of the second airfoil body.

6. The arm restraint assembly of claim 1, wherein a leading edge of the first airfoil body is oriented forward, when the primary arm is in a fully deployed position.

7. The arm restraint assembly of claim 6, further comprising a lock assembly operably coupled to the primary arm, wherein in the fully deployed position, the lock assembly limits a rotation of the primary arm about the primary arm pivot joint.

8. The arm restraint assembly of claim 1, further comprising secondary airfoil structure coupled to the secondary arm, the secondary airfoil structure including a second airfoil body.

9. The arm restraint assembly of claim 8, wherein at least one of a first camber of the first airfoil body is different from a second camber of the second airfoil body or a first attack angle of the first airfoil body is different from a second attack angle of the second airfoil body.

10. An ejection seat, comprising:
a seat back; and
an arm restraint assembly coupled to the seat back, the arm restraint assembly comprising:
a primary arm configured to pivot relative to the seat back; and
a primary airfoil structure coupled to the primary arm, the primary airfoil structure including a first airfoil body.

11. The ejection seat of claim 10, wherein the primary airfoil structure further includes:
a housing defining an inlet and an outlet of the primary airfoil structure; and
a plurality of airfoil bodies located within the housing, the plurality of airfoil bodies including the first airfoil body and a second airfoil body.

12. The ejection seat of claim 11, wherein at least one of a first camber of the first airfoil body is different from a second camber of the second airfoil body or a first attack angle of the first airfoil body is different from a second attack angle of the second airfoil body.

13. The ejection seat of claim 11, wherein a first pressure side of the first airfoil body is oriented toward a second pressure side of the second airfoil body.

14. The ejection seat of claim 10, further comprising:
a secondary arm configured to pivot relative to the seat back; and
a secondary airfoil structure coupled to the secondary arm, the secondary airfoil structure including a second airfoil body.

15. The ejection seat of claim 14, wherein at least one of a first camber of the first airfoil body is different from a second camber of the second airfoil body or a first attack angle of the first airfoil body is different from a second attack angle of the second airfoil body.

16. An arm restraint assembly for an ejection seat, comprising:
a primary arm configured to pivot about a primary arm pivot joint; and
a secondary arm configured to pivot about a secondary arm pivot joint, wherein at least one of the primary arm or the secondary arm is an airfoil.

17. The arm restraint assembly of claim 16, wherein in a fully deployed position, a leading edge of the airfoil is oriented forward.

18. The arm restraint assembly of claim 17, further comprising a netting coupled to the airfoil.

19. The arm restraint assembly of claim 18, further comprising a latch coupled to the primary arm, wherein the latch includes a hook portion, and wherein the secondary arm defines a secondary latch orifice configured to receive the hook portion.

20. The arm restraint assembly of claim 19, further comprising a lock assembly operably coupled to the primary arm, wherein in the fully deployed position, the lock assembly limits a rotation of the primary arm.

\* \* \* \* \*